United States Patent [19]
Korpel

[11] 4,097,730
[45] Jun. 27, 1978

[54] FOCUS CORRECTION SYSTEM FOR VIDEO DISC PLAYER

[75] Inventor: Adrianus Korpel, Prospect Heights, Ill.

[73] Assignee: Zenith Radio Corporation, Glenview, Ill.

[21] Appl. No.: 592,710

[22] Filed: Jul. 2, 1975

[51] Int. Cl.² .............................................. G01J 1/20
[52] U.S. Cl. .................................. 250/201; 250/204; 358/128
[58] Field of Search ................. 179/100.3 B, 100.3 V, 179/100.41 L; 250/201, 234, 204, 208, 209; 178/6.6 DD; 358/128

[56] References Cited

U.S. PATENT DOCUMENTS

| | | | |
|---|---|---|---|
| 1,891,227 | 12/1932 | Friebus | 250/234 X |
| 3,038,369 | 6/1962 | Davis | 250/201 |
| 3,381,086 | 4/1968 | Moss et al. | 179/100.3 XV |
| 3,530,258 | 6/1968 | Gregg et al. | 179/100.41 L |
| 3,847,485 | 11/1974 | Zanoni | 250/234 X |
| 4,025,784 | 5/1977 | Lehureau et al. | 250/201 |

Primary Examiner—David C. Nelms
Attorney, Agent, or Firm—Cornelius J. O'Connor

[57] ABSTRACT

A focus correction system exhibits an enhanced acquisition range by responding to a focus-servo pilot signal recorded on a video disc with the same spatial phase distribution in each turn of a multi-turn information storage track.

4 Claims, 12 Drawing Figures

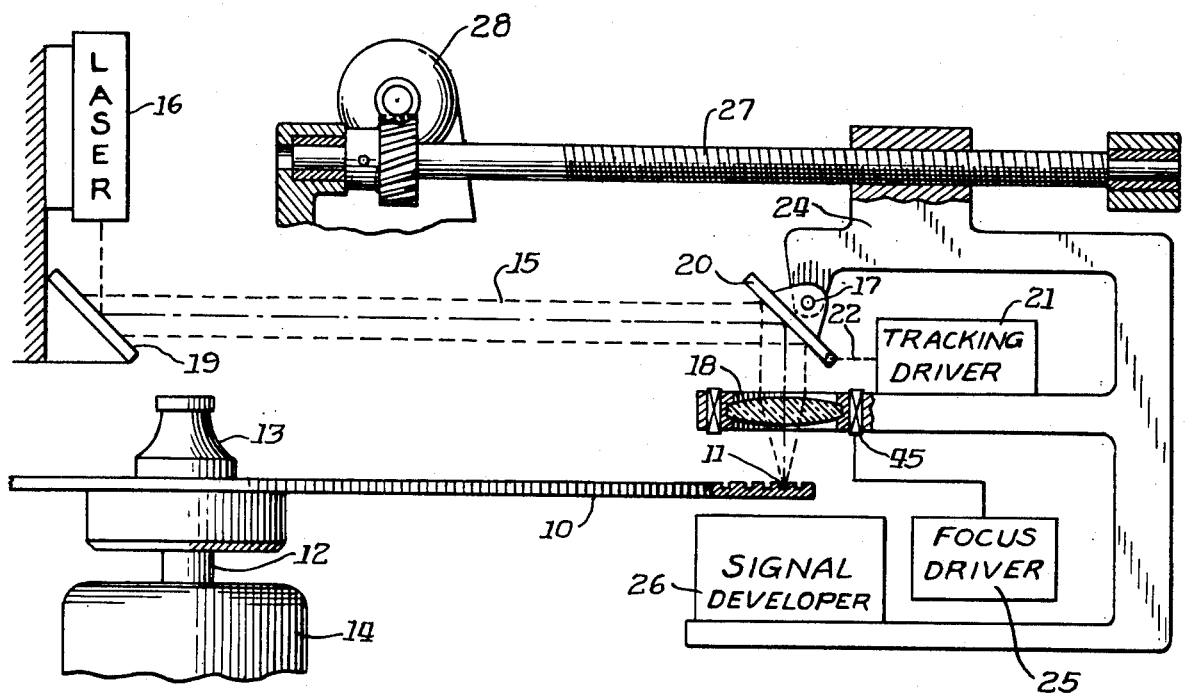
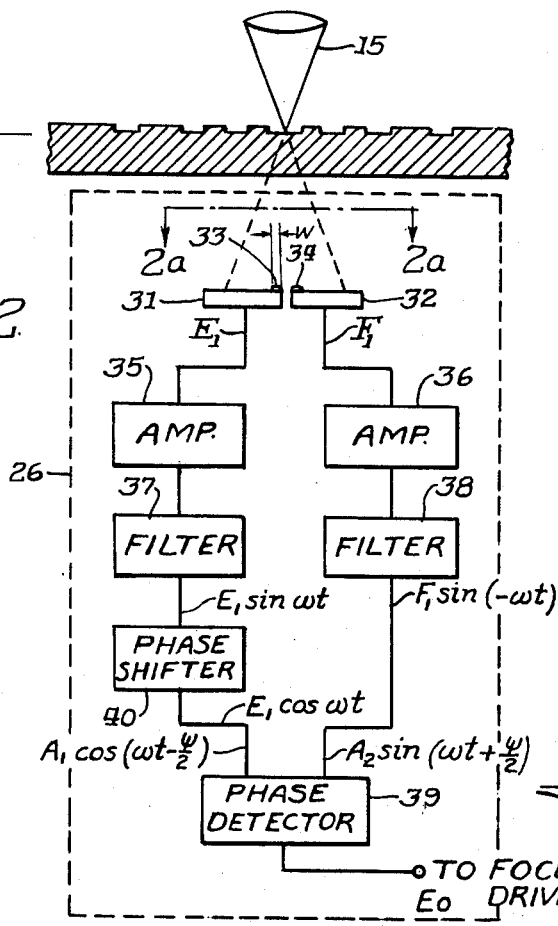
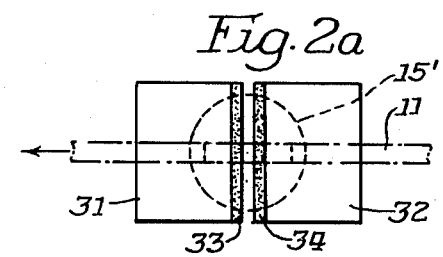
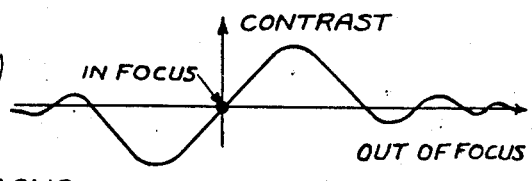

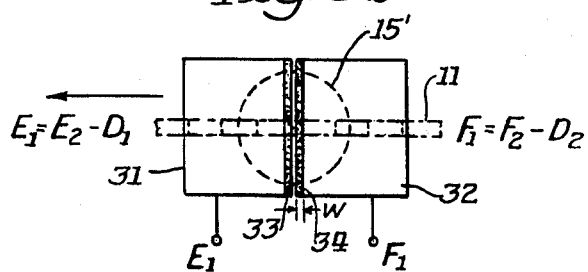
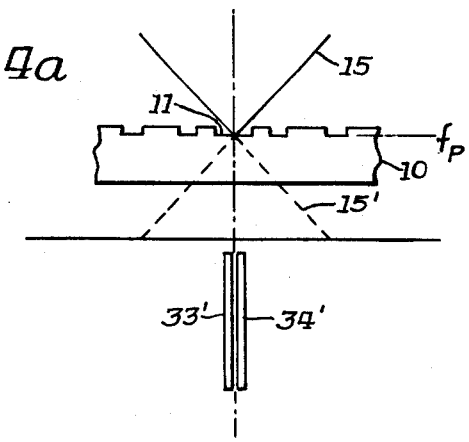
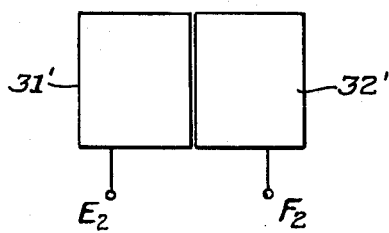
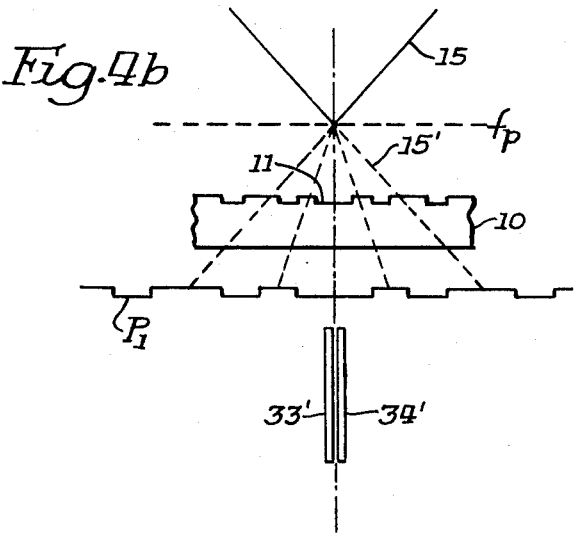
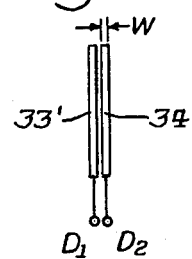
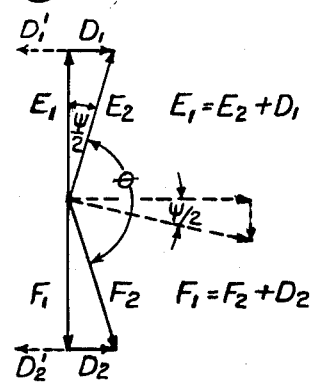
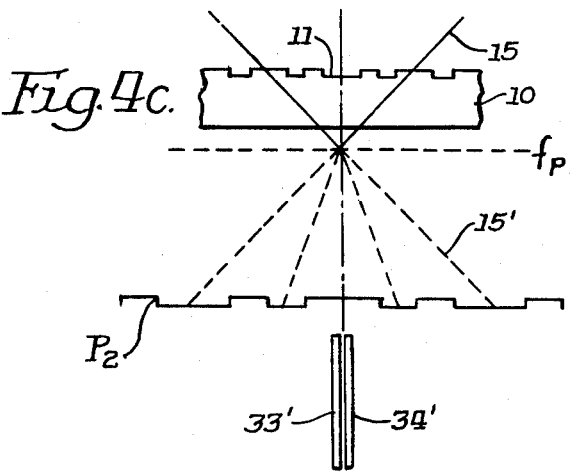

FOCUS CORRECTION SYSTEM FOR VIDEO DISC PLAYER

BACKGROUND OF THE INVENTION

The present invention, in general, is concerned with an image reproducing system, such as a video disc player, for scanning the spiral track of a video record to derive an electrical signal representative of the information stored in the record. In particular, the invention is addressed to a focus correction system for use in a video disc player. In the disclosed embodiment, the aforesaid derived electrical signal is suitable for use in controlling a television receiver to accomplish image reproduction. While a variety of systems are known for reading video discs, one of especial interest to the present invention employs a beam of energy, such as a laser beam, focused by a lens to scan and read out the information stored in the disc. The record may either be reflective to the reading beam or it may be transmissive and, simply for convenience, the latter approach will be discusses in detail in this specification although the invention is equally applicable to players operated in the reflective mode.

The video record herein considered is a circular disc having information stored in a multi-turn spiral track inscribed onto the disc surface either mechanically or through a chemical milling process, e.g., etching after recording on a photoresist layer, etc. In either case, the track is formed under the control of a carrier signal that is frequency modulated with the information to be stored such as the luminance, chroma, audio and synchronizing components of a conventional television program signal. The recording parameters are usually so selected that a single revolution of the disc contains the two image fields which collectively constitute a single frame of video information arranged in the NTSC format. It is appreciated, of course, that a related but specifically different format may be utilized by transcoding an NTSC signal prior to recording.

Reading such a disc with a laser beam usually requires that the disc be rotated through the beam and that the beam travel radially of the disc in order to scan all segments of the spiral record track. For that purpose, the disc may be mounted on a turntable or other support which is driven at an appropriate rate of speed or, particularly if the disc is a thin flexible foil, the support may be rotated at such a rate of speed as to accomplish what is referred to as flying the disc past a reading station. Problems of maintaining focus registration of the beam and disc are encountered in this type of installation. This is so because the depth of focus is small and the disc must be maintained within the focus region of the reading system. One approach to the problem that has heretofore been proposed, in conjunction with a flexible disc, employs a mechanical system of stabilizers designed to position that segment of the disc instantaneously presented to the reading beam with the precision required for proper focus conditions. The present invention may be employed as an adjunct to such system or it may be used independently to properly position the disc or the focusing lens.

Focus servo systems have also been proposed heretofore and they generally function on the basis that a signal can be developed using information obtained in the far field of the focused spot. This far field contains spatial, phase and amplitude modulation related to out-of-focus conditions; from which a focus-error correction signal may be developed and utilized to preserve focus. More will be said of this kind of system hereafter; suffice it to say, at this juncture, that the systems as previously proposed have had an acquisition range that is undesirably small.

OBJECTS OF THE INVENTION

Accordingly, it is an object of the invention to provide an improved focus servo arrangement for an optical image reproducing system.

It is a particular object of the invention to provide a focus servo for such a system which has an improved acquisition range.

SUMMARY OF THE INVENTION

An optical reproducing system, to which the invention has an especially attractive application, scans a multi-turn storage track of a video record with a focused beam of energy to derive stored information. That information includes a frequency modulated carrier signal and a focus-servo pilot signal having a frequency which is low relative to that of the carrier and exhibiting the same spatial phase distribution in each turn of the record track. An improved focus correction system for use in the aforesaid optical reproducing system comprises means, including a two-element photoreceptor positioned in the far field of the reading beam along a reference plane, responsive to a laser beam scansion of the track for developing a pair of pilot signals having a phase difference determined by the sense and degree of the out-of-focus condition of the reading beam relative to the storage track. The two pilot signals are applied to a synchronous detector which develops, in response thereto, a focus-error correction signal having a polarity and intensity determined by the sense and degree of out-of-focus condition. Finally, means are provided for utilizing this correction signal to maintain the beam focused on the record track.

BRIEF DESCRIPTION OF THE DRAWINGS

The features of the invention which are believed to be novel are set forth with particularity in the appended claims. The invention, together with further objects and advantages thereof, may best be understood by reference to the following description taken in conjunction with the accompanying drawings in which:

FIG. 1 is a schematic representation, partially broken away, of an optical video player to which the present invention may be advantageously applied;

FIG. 2 is a schematic diagram of a focus error detection circuit embodying the subject invention;

FIG. 2a depicts a photocell configuration particularly useful in the circuit of FIG. 2;

FIG. 2b is a vector diagram of the basic signals derived by the error detection circuit of FIG. 2;

FIG. 3 a is a vector diagram depicting the derivation of focus error correction signals;

FIGS. 3b–3d depict the constituents of the photocell device of FIG. 2a in a manner helpful to an understanding of its operation;

FIGS. 4a–4c are graphical representations of a record track disposed in the focal plane of the read beam, as well as displaced below and above that plane, respectively; and FIG. 5 is a graphical representation of the relationship between the focus condition of the readout beam and the contrast of the fringe pattern attributable to an out-of-focus beam condition.

DESCRIPTION OF THE PREFERRED EMBODIMENT

The playback system of FIG. 1 reads information stored in a record carrier or video disc 10 of suitable material, such as polyvinyl chloride, which has the capability of storing the program information. The information is carried in a multiturn spiral shaped track 11 pressed or cut into the surface of the disc, either mechanically or chemically. In a preferred case, a writing laser beam records the program upon a master in NTSC format so that a reading of a disc replicated from that master directly produces an NTSC signal for utilization without need for signal transcoding. On the other hand, the program signal may be coded before it is used to control the writing beam employed to generate the master. In any event, the present invention has applicable in either situation.

The laser beam is controlled in the recording process by a carrier signal that is frequency modulated by a program signal comprising, inter alia, luminance components, a subcarrier amplitude and phase modulated with chroma information, synchronizing and audio components. In the case of an NTSC signal, the program signal further includes a burst of the chroma subcarrier during horizontal retrace intervals. This burst is employed to regenerate a chroma demodulating signal in the color receiver to which the NTSC signal may be applied. In practicing the subject invention, it is additionally necessary that the stored information include a focus servo pilot signal having a frequency which is low relative to that of the carrier signal and exhibiting the same spatial phase distribution in each turn of the storage track. In other words, the spatial pattern representative of this pilot signal, along any particular portion of a track, is substantially identical to the pilot signal spatial pattern in the track portions of the immediately adjacent tracks. The pilot signal may be recorded simply by using it as an auxiliary modulation of the recording laser beam or, alternatively, it may be a modulation component of the carrier signal. By way of illustration, if the focus servo pilot is desired to be a signal of 1 MHz, a signal of that frequency may be used to modulate the recording laser beam or, assuming the carrier to have a mean frequency of 10 MHz, the pilot may be the lower sideband of 1 MHz obtained by modulating the carrier with a 9 MHz signal.

Since both mechanical and chemical methods of cutting the disc are known, and since neither constitutes any part of the present invention, there is no need for further elaboration here other than to note that the recorded information takes the form of a succession of cavities or pits alternating with lands and disposed along a spiral storage track to constitute, collectively, spatial representations of both the frequency modulated carrier wave signal and the focus servo pilot signal. The amplitude of the pilot signal is generally in the range of 5 to 10% of the carrier.

As indicated in FIG. 1, a disc 10, for the embodiment under consideration, is formed sufficiently thin to be flexible and is supported upon a spindle 12 and retained in position thereon by a removable cap 13. The spindle and disc are driven by a motor 14 at a speed sufficiently high, of the order of 1800 rpm, to accomplish flying of the disc.

Reading of disc 10 to develop electrical signals conveying the stored information requires a reading beam 15 developed by a laser source 16 which projects a beam of monochromatic coherent light along a path to a final or focusing lens 18 which focuses the reading beam onto a track 11 of disc 10. The physical relationship of source 16 to lens 18 is of no particular concern since the desired light path is easily established with mirrors, such as a stationary mirror 19 and a movable mirror 20, strategically positioned so as to direct beam 15 to the focus lens 18.

Mirror 20 is suspended from a universal pivot 17 for selective displacement about one or more reference axes under the control of a tracking driver 21 coupled to the mirror, which coupling is indicated by broken-construction line 22. The reading beam must, of course, be maintained in radial registration with track 11 of the disc and this is accomplished by energizing driver 21 with a radial-error correction signal. At the same time, it is desirable to have driver 21 arranged to displace mirror 20 about an orthogonally related axis to shift the beam in either direction along a tangent to the track for timing-error correction. Since apparatus for achieving both types of correction are well known in the art, the subject will not be further discussed since that would unnecessarily complicate the present discussion. Suffice it to say that an attractive form of displaceable mirror 20 and tracking driver 21 for radial-error and timing-error correction is described and claimed in copending application Ser. No. 456,918, filed Apr. 1, 1974 now U.S. Pat. No. 3,946,166, which issued Mar. 23, 1976 in the name of Karl Wossidlo and assigned to the assignee of the present invention.

In order to track the record and read out all segments thereof, assuming that tracking registration is maintained, it is necessary to move the reading beam continually in a radial direction over the disc at a proper speed if the disc is to be read or scanned without interruption from start to finish of the track. For scansion purposes, therefore, in addition to spindle motor 14, a carriage 24 is provided which supports tracking driver 21 and mirror 20, a focus driver 25 for controlling the position of focus lens 18, and a control signal developer 26. This carriage effects a threaded engagement with a worm gear 27 suitably driven by a reversible motor 28 which advances the reading head radially in either direction and at a desired speed, both for continuous reading of storage track 11 from start to finish as well as for selective reading of segments of the track. These mechanical features, which are no part of the present invention, are well documented in the art.

A control signal developer, which is detailed below, is shown in block diagram form enclosed within the area identified by reference numeral 26 in FIG. 2. This figure also includes a longitudinal i.e., tangential, section through that portion of track 11 under scansion. The axis or center line of reading beam 15 will coincide with the plane of the drawing during those operating intervals when the beam is in proper radial tracking registry with storage track 11. Additionally, correct focusing obtains when, as indicated in FIG. 2, reading beam 15 converges to a focal point upon track 11.

As the record track 11 rotates through the reading beam, the beam is periodically diffracted or, in effect, modulated by the information stored in the illuminated portion of the track. As a result, zero, first, second and higher order diffraction components are produced which sweep tangentially, principally, of the illuminated track portion. As the beam emerges from transmissive disc 10 its diffracted orders impinge upon a two-element photoreceptor which can take the form of a pair of masked photocells 31, 32 arranged to straddle track 11. Cells 31, 32, which in practice comprise photodiodes, are positioned in the far field of the diffracted pattern 15' of beam 15 and are dimensioned to capture all of the tangential directed zero order diffraction components, see FIGS. 2 and 2a. Diodes 31, 32 are symmetrically disposed with respect to the axis of the reading beam and, are arranged in a closely spaced confronting relation with the gap separating them disposed substantially normal to the track portion under scansion. As seen in FIG. 2, as well as FIG. 2a, diodes 31, 32 include respective mask portions 33, 34 which, for purposes soon to be made clear, shield predetermined areas of the confronting portions of the diodes from the reading beam.

Focus tracking is attained by means of a control system 26 that includes diodes 31 and 32 which, as previously noted, are positioned in the far field of diffracted beam pattern 15'. In responding to the components of the diffracted beam, diodes 31, 32 develop output signals which are applied to respective amplifiers 35, 36. Since, for focus tracking purposes, it is only the pilot signal components of the diode output signals that are of interest, the amplified outputs of amplifiers 35, 36 are applied to filters 37, 38 respectively, which are tuned to pass only electrical signals corresponding to the spatial pattern of the focus servo pilot signal recorded on the track. Accordingly, it will be assumed, and subsequently established, that the output of filter 37 can take the form $E_1 \sin \omega t$; the output of filter 38 would then be $F_1 \sin(-\omega t)$.

The output of filter 38 is applied to a first input terminal of a synchronous phase detector 39 while the output of filter 37 is applied, via a phase shifter 40, to a second input terminal of the phase detector.

The function of phase shifter 40 is to adjust the phase of the output of filter 37 so that it assumes a predetermined phasal relation to the output signal of filter 38. For reasons soon to be made clear, it is preferred that phase shifter 40 shift the phase of the signal applied thereto by 90° so that the output of filter 37 now takes the form of $E_1 \cos \omega t$, FIG. 2b.

Phase detector 39 is of a construction such that, in response to a pair of quadrature related signals, the output of the detector is zero. This, of course, would be the case where two signals of the form $E_1 \cos \omega t$ and $F_1 \sin(-\omega t)$ are applied and this, as will be seen, is indicative of zero focus error signal, i.e., track 11 being coincident with the focal plane of the read beam.

Focus tracking, in accordance with the present teaching, may be accomplished irrespective of whether the disc being read has pits of a quarter-wavelength depth or half-wavelength depth. When a record track comprising quarter-wavelength pits is scanned by a light beam, scattering of the beam occurs tangentially of the track and this scattering is a maximum as the beam traverses a zero crossing, i.e., a pit edge. When the beam is in the center of a pit some radial scattering is detectable, particularly if the pit depth varies from the desired quarter-wavelength. However, this is of no consequence in the practice of the subject invention.

Assuming then, for purposes of discussion, that the record track herein considered is comprised of quarter wave pits, when the read beam traverses a pit an output signal $E_1$ is derived from photodiode 31 while an output signal $F_1$ is derived from diode 32. As will be shown, these signals are of maximum amplitude and, 180° out-of-phase, at the zero crossings.

The manner in which output signals $E_1$, $F_1$ are derived by diodes 31 and 32 will now be discussed in greater detail in connection with FIGS. 3a–3d. It will be assumed that the track portion 11 shown in FIG. 3b is moving in the direction indicated by the arrow, i.e., to the left. Now, ignoring for the moment the effect of diode masks 33, 34, as the leading edge of a pit encounters the read beam, the beam is tangentially scattered forwardly, i.e., in the direction of track travel, to impinge principally upon diode 31 and thereby produce the output signal $E_1$, FIG. 3a. As the center of the pit passes under the beam, tangential scattering is as much rearward as forward, thus reducing the output of diode 31 while inducing an output signal $F_1$ from diode 32. Then, as the trailing edge of the pit passes beneath the beam, beam scattering is predominantly rearward giving rise to a peak in signal $F_1$ from diode 32 while reducing the output signal $E_1$ from diode 31 to a minimum. Accordingly, by virtue of the physical arrangement of the diodes relative to the pits and with the assumed direction of track travel, the signal $E_1$ will always be 180° out-of-phase with respect to signal $F_1$, FIG. 3a.

The output signals $E_1$, $F_1$ are representative of the spatial pattern formed by the track pits and lands. This pattern may be representative of RF information or of the previously mentioned relatively low frequency focus servo pilot signal, especially recorded to serve as a focus servo signal. A low frequency pilot signal is preferred as a source of focus error signal since, as will be shown, it enhances the acquisition range of the control system.

The manner in which a focus error signal is derived will now be explained. As noted above, when the masked diodes 31, 32 are symmetrically arranged beneath the record track and illuminated by a diffracted read beam, an electrical signal corresponding to the modulated signal employed in creating the spatial pattern of the track is developed. The problem, however, is that a signal is developed even when the track departs from the focal plane of the objective lens, thus affording no indication of the focus condition.

The object of the invention, then, is to derive a signal that is not only indicative of the extent of defocusing, if any, but, more importantly, of the direction in which the track has departed from the focal plane. Referring again to FIG. 3b, we see that the pair of very closely spaced photodiodes 31, 32 have their respective masked portions 33, 34 extending in a direction transverse to the record track. Desirably, diodes 31, 32 should be so juxtaposed as to be just short of making physical contact. As graphically depicted in FIGS. 3a–3d, the output signal $E_1$ of masked diode 31 can be equated to the output $E_2$ of an unmasked diode 31' minus the output $D_1$ derived from an imaginary strip-like diode 33' having a light responsive surface area equivalent to the area of mask 33. By the same token, the output $F_1$ of masked diode 32 is equivalent to the output $F_2$ of an unmasked diode 32' minus the output $D_2$ derived from a second imaginary strip-like diode 34' having a light responsive surface area equal to the area of mask 34.

By virtue of their configuration and placement, i.e., very narrow in the tangential direction and very closely spaced, diode strips 33', 34', at any instant of scanning, always monitor substantially the same bundle of light. As a result, the signal $D_1$ developed by diode 33' is always in phase with signal $D_2$ developed by diode 34'. Moreover, since diodes 33', 34' receive minimum or maximum illumination when the read beam is at the center of a pit, their output signals will be displaced in phase by 90° from the signals $E_1$, $F_1$ derived by diodes 31, 32 which, as explained above, receive maximum or minimum illumination when the beam traverses a pit edge, or zero crossing, FIG. 3a.

When the read beam is properly focused on the record track, FIG. 4a, both of the photodiodes 33', 34' receive substantially unchanging illumination during the time the beam is scanning a pit. In other words, the sweep of the beam across these diodes is such that irrespective of the position of the beam, i.e., tangentially scattered forward or rearward, the light energy impinging upon diodes 33', 34' will not substantially vary in time. Hence, in this FIG. 4a situation, the output of diodes 31, 32 is simply $E_1$ and $F_1$, a manifestation, as will be seen, of zero error signal and, therefore, the in-focus condition.

An out-of-focus condition is depicted in FIG. 4b wherein the record track 11 is shown displaced to a point below the focal plane $f_p$ of the beam. In this situation, a light fringe pattern $P_1$, resembling an enlarged replica of the spatial pattern of track 11 and having a phase in concert with the pit and land pattern of the track, is created. (It can be assumed that a fringe pattern exists when track 11 coincides with the focal plane of the beam FIG. 4a, however, in that case, the spacing between fringe elements is infinite so that, for all practical purposes, no fringe pattern is apparent or detectable.) Accordingly, as the track departs from the focal plane, a discernible, detectable fringe pattern resembling the spatial pattern of the track is created. The elements forming this fringe pattern assume a spacing that is inversely proportional to the degree of defocusing so that a fine fringe pattern is indicative of substantial defocusing. In this defocused condition, therefore, the fringes, or bundles of light, pulse diodes 33', 34' into conduction creating pulse train signals $D_1$, $D_2$ of like polarity. The amplitudes of signals $D_1$, $D_2$ correspond to the condition of focus, i.e., the amplitude is proportional to the degree of defocusing.

A second out-of-focus condition is illustrated in FIG. 4c in which track 11 is now displaced to a position above the focal plane $F_p$ of beam 15. In this situation, a detectable fringe pattern $P_2$ is again developed. Note in this instance, however, that fringe pattern $P_2$ is 180° out-of-phase with the pit and land pattern of the track. Again, the action of the fringe pattern sweeping across diodes 33', 34' develops a pair of pulse train signals $D'_1$, $D'_2$ similar to signals $D_1$, $D_2$ but 180° out-of-phase with those signals, see FIG. 3a, and thus indicative of an opposite sense of defocusing.

The signals $D_1$ and $D_2$ constitute vector additions to signals $E_1$, $F_1$, respectively, so that the resultant output signals from the photodiodes may be represented by the vectors $E_2$, $F_2$. Since the magnitude and phase of signals $D_1$, $D_2$ are identical the included angles ($\psi/2$) between $E_1$ and $E_2$ and between $F_1$ and $F_2$ are likewise identical.

In order to most efficiently derive the above-mentioned pulse train signals $D_1$ and $D_2$, the width "w" of each of the masks 33, 34, see FIG. 3b, that is, the dimension parallel to the longitudinal direction of the track, should not exceed one-half the fringe spacing for the pilot signal at maximum contrast. Preferably, therefore, the width "w" of each mask is desirably equal to or less than one-half the aforesaid fringe spacing. Recalling that the imaginary diodes 33', 34' have light responsive areas equivalent to respective masks 33, 34, it follows that diodes 33', 34' will also have an identical width "w", FIG. 3d.

As shown in FIG. 3a, the phase angle $\theta$ between vectors $E_2$ and $F_2$ is less than 180° but significantly greater than 90°. Recalling now that phase detector 39 is selected so that its response to a pair of quadrature signals is zero, it can be concluded that when the phase difference between vectors $E_2$ and $F_2$ is 90° the output of the phase detector will be zero.

Accordingly, in order to provide utilizable signals for the phase detector, the function of phase shifting network 40 is now clear. Its purpose is to adjust the phase relationship of signal $E_1$ with respect to $F_1$ so that, absent any contribution from vectors $D_1$ and $D_2$ (or $D'_1$, $D'_2$), the phase difference between $E_1$ and $F_1$ will be substantially 90°. This vector relationship is graphically depicted in FIG. 3a.

Assume now that the output of phase shifter 40 takes the generalized form $A_1 \cos(\omega t - \psi/2)$ and that the output of filter 38 is of the form $A_2 \sin(\omega t + \psi/2)$. Upon application of these two signals to phase detector 39, a focus-error correction signal is derived, which (for certain types of phase detectors) can be defined as the average product of these two signals:

$$E_0 \alpha \int_0^{T=\frac{2\pi}{\omega}} \sin(\omega t + \frac{\psi}{2})\cos(\omega t - \frac{\psi}{2})dt \; \alpha \; \sin\psi$$

In other words, the output of detector 39 will be proportional to the sine of $\psi$. Other types of phase detectors, well known in the art, may give an output proportional to $\psi$. When $\psi$, which, it is recalled, is an angle determined by the magnitudes of $D_1$ and $D_2$, is zero, the above recited function reduces to zero, the previously declared manifestation of the in-focus condition.

On the other hand, when the detector produces an output signal $E_0$, its polarity denotes the sense of an out-of-focus condition while its amplitude reflects the extent or degree of that condition. The focus-error correction signal is supplied to focus driver 25 which, by virtue of its coupling to a lens actuating means 45, adjusts the position of lens 18 to maintain beam 15 in focus on the storage track of disc 10. As lens 18 approaches a position that effects the in-focus condition, signals $D_1$ and $D_2$ will be reduced to zero, the phasal relationship of vectors $E_2$ and $F_2$ will approach 180°, the angle $\psi$ approaches zero and the output of the phase detector, being proportional to the sine of $\psi$, also approaches zero.

Insofar as utilization of correction signal $E_0$ is concerned, it is only necessary that driver 25, to which it is applied, be capable of displacing lens 18 in controlled amounts in either direction along the axis of the light path of beam 15 until the focal plane of the lens is returned to that portion of the track under scansion. A variety of structures suggest themselves for accomplishing this result. A very simple one comprises an electromagnetic motor drive constructed essentialy the same as a loudspeaker and coupled to focus lens 18, which motor drive, in response to an applied signal, displaces lens 18 from a reference position an amount and direction determined by the amplitude and polarity of the correction signal ($E_0$) developed by phase detector 39. Alternatively, it is recognized that a driver, responsive to correction signal $E_0$, can be coupled to a structure for physically moving the disc spinning mechanism, or the disc alone, to displace that mechanism an amount and direction determined by the amplitude and polarity of signal $E_0$ to return the scanned portion of the track to the focal plane of the reading beam.

As previously noted, the further track 11 is displaced from the focal plane of the beam, the finer the fringe patterns become and, to a point, the greater the contrast. Beyond this point the contrast decreases. This is graphically depicted in FIG. 5 which shows a linear range in which the contrast extends, in both directions, from a zero point representative of the in-focus condition, to knee portions of curves indicating conditions of maximum contrast and then, in each case, a decrease in contrast. The contrast parameter is of significance in that it is indicative of the available light energy in the fringe pattern and thus the condition of focus. For example, a very low contrast pattern (widely spaced pattern elements) is indicative of a near in-focus condition, and thus results in a relatively weak signal output from equivalent diodes 33', 34'. The range over which the contrast is linear is approximately equal to the square of the wavelength of the detected spatial pattern divided by the wavelength of the light employed in the read beam. Bearing that relationship in mind, it is now apparent that a relatively low frequency pilot signal (i.e., one having a relatively long spatial wavelength) will provide a more extended linear contrast range and thus enhance the acquisition range of the system.

It is now apparent that if the carrier component of the frequency-modulated signal is employed to energize a focus servo system and, if that component had a frequency of 10 MHz, for example, its spatial wavelength would be of the order of only 2 microns. The acquisition range of a system utilizing a 10 MHz component would be extremely narrow, being approximately 7$\mu$m.

According to the present invention on the other hand, the focus servo pilot component may, as already suggested, have a frequency of about 1 MHz. Its spatial frequency is then of the order of 20 microns with a resulting improvement in acquisition range to 700$\mu$m. In other words, significant improvement results by using a focus servo pilot signal of substantially longer spatial wavelength than the carrier signal of the program information. But, as previously noted, another requirement must be satisfied for the system to function properly and that is that the focus servo pilot must have the same spatial phase distribution as between adjacent turns of the multi-turn spiral track 11. In other words, it must exhibit phase coherence from turn to turn. This is because during out-of-focus conditions the beam may well span more than one turn of th storage track and, if the phase coherence requirement of the pilot component is not satisfied, the spatial frequency components contributed by the various turns within the view of the reading beam will have random relative phase and may totally defeat the focus servo system. On the other hand, if phase coherence is present, components detected from adjacent tracks augment one another in maintaining focus. To satisfy this condition it is necessary, therefore, that the focus-servo pilot signal be synchronous with the rotation rate. In short, the pilot frequency must be integrally related to the frame frequency, which in a recording of a video program is conveniently one frame per revolution of the disc.

Finally, while the above presentation has been predicated on a structure in which a pair of closely spaced photodiodes had portions of their light responsive surfaces masked off, it is recognized that the objects and results of the invention can also be achieved by taking a pair of photodiodes similar to devices 31 and 32 and removing portions of their light responsive surfaces corresponding in area to that of masks 33, 34.

While there has been described a particular embodiment of the present invention, it is apparent that changes and modifications may be made without departing from the invention in its broader aspects. The aim of the appended claims, therefore, is to cover all such changes and modifications as fall within the true spirit and scope of the invention.

What is claimed is:

1. In an optical reproducing system in which a multi-turn storage track of a video record is scanned by a focused reading beam of energy to derive information stored in said track, such information including a frequency modulated carrier signal and a focus-servo pilot signal having a frequency which is low relative to that of said carrier and exhibiting the same spatial phase distribution in each turn of said track, a focus correction system comprising:

a displaceable focusing lens disposed in the path of said reading beam;

means, including a photoreceptor comprising first and second light responsive elements symmetrically disposed with respect to the axis of said reading beam and arranged in a spaced apart confronting relation with the gap separating said elements disposed substantially normal to that portion of said track under scansion, each said element comprising a mask portion extending across said element adjacent to and paralleling said gap for effectively shielding a predetermined area of said element from said reading beam, said elements being positioned in the far field of said reading beam so as to be responsive to the scanning of said track by said beam for developing a pair of signal components representative of the spatial pattern of said pilot signal, said components having amplitudes and a phase relation indicative of the degree and sense of the out-of-focus condition, if any, of said beam relative to said track, with one of said components effectively constituting a reference signal for the other said component;

a phase shifter coupled to the output of said first element for shifting the phase of said signal component developed by said first element with respect to said signal component developed by second element an amount sufficient to establish, in the absence of an out-of-focus condition, said components as a pair of quadrature related signals;

a synchronous detector responsive to said pair of quadrature related signal components for developing a focus-error correction signal having an amplitude and polarity determined by the degree and sense of out-of-focus condition;

and actuating means coupled to said focusing lens and responsive to said correction signal for displacing said lens an amount and in a direction proportional to the amplitude and polarity of said correction signal to maintain said beam focused on said track.

2. A focus correction system as set forth in claim 1 in which each of said mask portions has a width dimension parallel to the tangential direction of said track, which dimension is equal to or less than one-half the fringe spacing for said pilot signal at maximum contrast.

3. A focus correction system as set forth in claim 1 in which said actuating means comprises an electromagnetic motor drive coupled to said focus lens.

4. A focus correction system as set forth in claim 1 in which said synchronous detector comprises a device which, in response to said pair of quadrature related signal components produces zero output.

* * * * *